United States Patent [19]

Herding et al.

[11] Patent Number: 4,876,288
[45] Date of Patent: Oct. 24, 1989

[54] CARRIER MATERIAL FOR IMMOBILIZATION OF MICROORGANISMS

[75] Inventors: Walter Herding, Amberg; Walter Rausch, Altdorf, both of Fed. Rep. of Germany

[73] Assignee: Herding GmbH Entstaubungsanlagen, Amberg, Fed. Rep. of Germany

[21] Appl. No.: 35,636

[22] Filed: Apr. 7, 1987

[30] Foreign Application Priority Data

Apr. 7, 1986 [DE] Fed. Rep. of Germany ....... 3611582

[51] Int. Cl.⁴ .............................................. C08G 18/00
[52] U.S. Cl. ...................................... 521/53; 521/44; 521/48; 521/55; 435/174; 435/176; 435/180; 435/182; 210/500.25; 210/510.1; 210/615; 210/616; 210/618; 210/767; 210/908
[58] Field of Search ..................... 521/44, 48, 55, 53; 210/615, 616, 618, 767, 500.25, 510.1, 908; 435/174, 176, 177, 180, 182

[56] References Cited

U.S. PATENT DOCUMENTS 4,634,672  1/1987  Baumgarten et al. .............. 435/182

Primary Examiner—John Kight
Assistant Examiner—Samuel A. Acquah
Attorney, Agent, or Firm—Peter K. Kontler

[57] ABSTRACT

Carrier material for the immobilization of microorganisms, particularly for use in connection with microbiological conversion and/or separation of constituents from gaseous or liquid media, is disclosed. The carrier material comprises a dimensionally stable macroporous skeleton comprised of relatively coarse-grain granular material such as sinterable thermoplastic granules, and relatively fine grain microporous material, such as activated charcoal, which are bonded together. The carrier material thus comprises both macropores having a pore size of from about 10 to 200 μm and micropores having a pore size of up to about 0.1 μm depending upon the identity of the five grain microporous material that is used. Additional finely divided materials, such as catalytic agents or density modifying agents, may also be disposed within the macroporous skeleton. The preparation and use of the carrier material is also disclosed.

19 Claims, 1 Drawing Sheet

CARRIER MATERIAL FOR IMMOBILIZATION OF MICROORGANISMS

The invention relates to a carrier material for immobilization of microorganism, especially for segregation of impurities from gaseous or liquid media, which is dimensionally stable and is provided with a plurality of pore-like openings of different sizes.

In order to segregate contaminants which consist of dissolved liquid or gaseous media from mixtures of gases, it is known to employ for material transformation microorganisms which are brought in contact with the substrate. The substrate can constitute a gas or a liquid. The liquid can be water wherein the substrate for the microorganisms is formed by contaminants in the form of dissolved gases or solid substances or by other liquids or solid substances. The situation is similar in the case of media in the form of gases which are contaminated, e.g., by odorous substances or in the case of other gases which serve as a feeding ground for microbic decomposition. Contact between the substances to be decomposed and the microorganisms can be established in different ways. The microorganisms can freely swim around in the medium, especially if the substrate is a liquid. However, it is also possible to combine the microorganisms with carrier substances, namely to immobilize the microorganisms so that the microorganisms move in the liquid with the carrier substances, e.g., in a fluidized bed. These microorganisms can further remain at a standstill in a reactor (fixed bed) wherein the medium flows through them. However, tests indicate that especially an immobilization of microorganisms brings about a higher degree of purification because the surrounding zone of the medium which can be reached by the microorganisms is larger and, accordingly, the microorganisms can find a larger "foraging ground".

The most frequently examined possibilities of immobilization for the purpose of decomposing contaminants in media or substrates include:
(a) Confinement of cells in interlaced gels or membrane like formations,
(b) Intercellular interlacing,
(c) Covalent bonding of cells to organic material,
(d) Adsorption of cells on the surface of a suitable carrier material.

In the case of adsorption of microorganisms on carrier materials, there become effective physical bonding mechanisms in order to retain the microorganisms. The probably best known example of utilization are filler bodies (percolating filters) in liquid waste cleaning plants to which the microorganisms adhere to form micellae.

At the present time, the filler bodies are made of plastic material in specific shapes but without press, or of volcanic porous natural stone.

However, if the microorganisms which adhere to smooth surfaces are to be utilized in other reactors, wherein external forces act counter to the physical bonding forces, such as for example the shearing forces generated by a flowing liquid in stirrer type reactors, the bonding forces at the smooth surfaces of the polypropylene percolating filters do not suffice any longer and the microorganisms ara rinsed away.

A substantial improvement is achieved by utilizing porous carriers on which the microorganism grow in the the pores and are thus capable of gaining a stronger hold. This is achieved in the aforementioned porous volcanic stone which, however, exhibits the drawback of high density to liquid waste and the resulting greater weight which must be taken up by larger reactors and which may be coped with during evacuation.

It has further become known to use a porous foamed substance with a density of 10 to 200 kg/m$^3$ and with open macropores of 0.1 to 5 mm which serves as a carrier substance. Though the lower density facilitates convenient circulation in the substrate to be treated, it is necessary, even in the event of utilization in a fixed-bed reactor, to provide suitable fastening and holding devices in order to prevent continuous floating and unintentional evacuation from the reactor.

An object of the invention is to provide a carrier material of such nature that it exhibits a pronounced adsorption capability for microorganisms and, in addition, promotes an advantageous multiplication of microorganisms in its macropores and, moreover, its micropores store foodstuffs for micoorganisms.

In accordance with the invention, this object is accomplished with a carrier material of the aforedescribed type in that the carrier material consists of at least two material components wherein at least one of these material components is provided with the micropores and can consist especially of activated carbon or clay with fine pores, and a second material component consists of coarser grains, in that various components of the mixture are connected to each other in accordance with a bonding or sintering technique so as to develop macropores in addition to micropores, and in that all of the pores are suitable for absorption of microorganisms as well as of dissolved harmful substances and can be put to use for biological decomposition of substances in liquid or gaseous media.

With these undertakings, there is provided a carrier material which, in dependency on the field of its utilization, can assume different geometric shapes and can provide a sufficently large space for reception of microorganisms. In addition, the weight per unit volume of the carrier material can be determined by appropriate selection of its porosity to meet the existing requirements and, especially if used in liquids, to constitute a swimming, floating or sinkable body. In view of the possibility of confining secondary materials in the primary material of the carrier body, it is conceivable to add to primary material even such materials which are especially suited to promote the growth of microorganisms.

It has been further ascertained that the drawbacks of heretofore known carrier materials can be avoided with the invention in that
(a) a relatively coarse-grained basic material, such as for example a themoplastic substance or another material which is provided with an adhesive outer layer, can be converted into a coarse-pore material skeleton under the action of temperature and/or pressure by resorting to a sintering or bonding techniques. Such a material, with a pore size of approximately 10 to 200 $\mu$m, can serve for the settling of smallest (pseudomonades) and up to largest (yeasts and fungi) microorganisms.
(b) an additive material which is provided with very small pores from the beginning, such as for example activated carbon with pore sizes of 0–500 A or a fired clay material with a pore width of up to 10$^{-7}$ m. It is well known that, for example, activated carbon is best suited for absorption or absorption not only of small microorganisms but also of harmful substances and can store substantial quantities due to it large internal surfaces and number of pores. A drawback is a low scuff resistance in the event of an action by external forces, be it due to forces which are developed by the flowing liquid or as a result of collision with other parts. Scuffing is largely avoided by embedding the microporous substance in the macroporous base frame and, therefore, the storing action is fully effective. Especially pronounced fluctuations of harmful substances, which can be decomposed by the microorganisms but can have a toxic effect upon the microorganisms in large concentrations, can be stored in the micropores to be processed at a later time.

(c) further additive materials, which are of advantage for the metabolism of the microorganisms, can be added to a certain extent.

Thus, it is known that nickel, e.g., in fine pulverulent state, is effective catalytically for conversion of substances. In addition, it is possible to influence the density of the carrier material within a certain range. A 10% nickel powder content could be realized.

Additional advantageous further developments of the invention can be found in the remaining dependent claims.

The drawing shows schematically two possible embodiments of the invention. There are shown in:

The carrier material 1 according to the invention is formed essentially by a shaped body which consists of at least two material components one of which is a polymerized synthetic material and the other, e.g., an activated carbon. The two components, of which the synthetic material can constitute a powder and activated carbon can be of a gritty consistency, are mixed with each other in a ratio which is determined in advance and are thereupon introduced into a shaping tool. In this shaping tool, the two components are bonded to each other by sintering, namely in such a way that larger and smaller openings, i.e., pores, remain between the material parts which are connected to each other.

Figure 1:
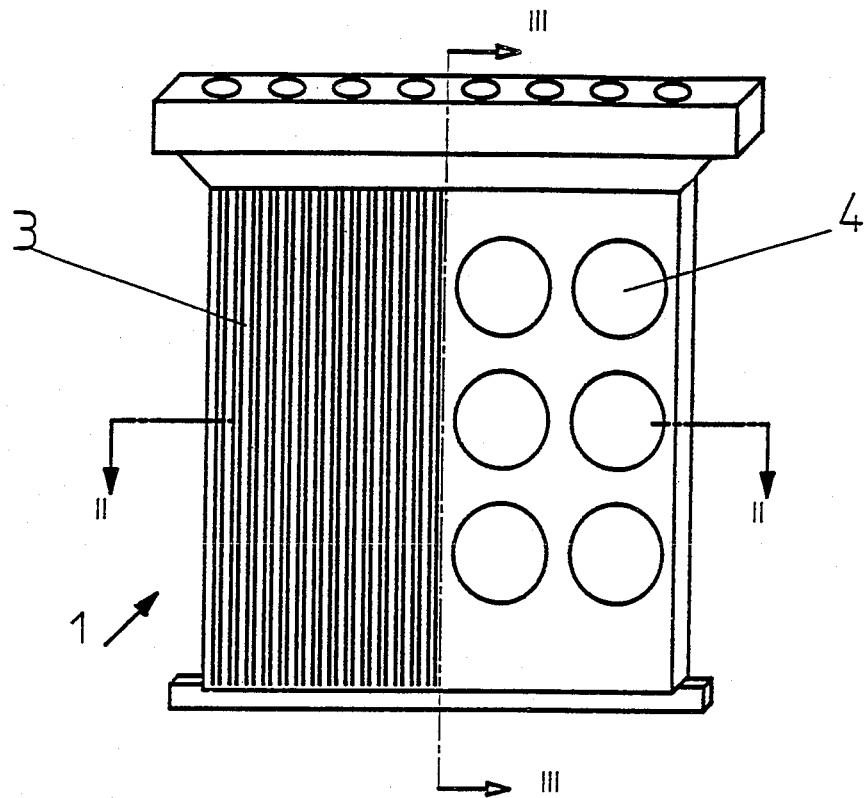
FIG. 1 a side elevational view of a shaped body with two differently designed carrier materials.
Figure 4:
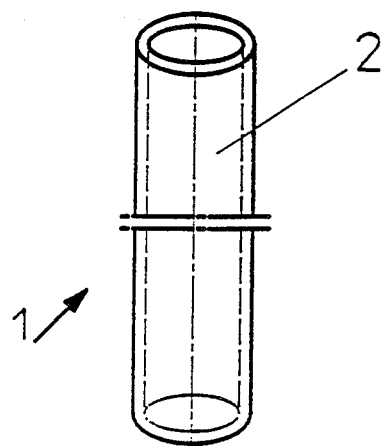
Figure 2:
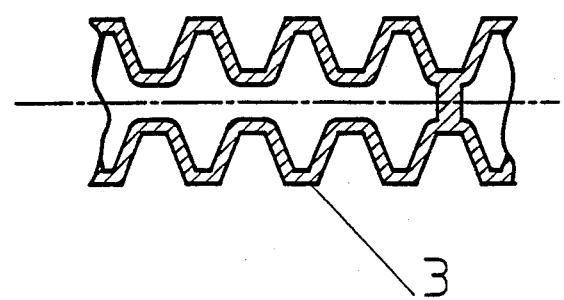
FIG. 2 is a sectional view of the shaped body according to FIG. 1 in the plane II—II, FIG. 3 a section of the shaped body according to FIG. 1 in the plane III—III and FIG. 4 a cylinder-shaped shaped body.
Figure 3:
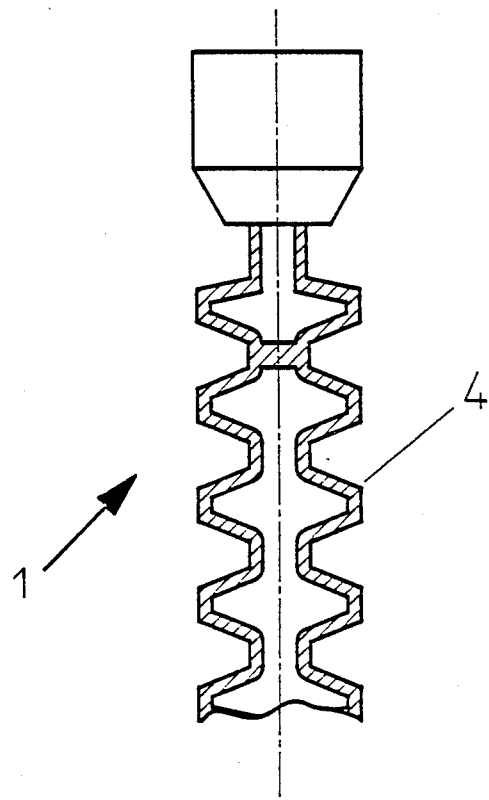

These two material components can be configurated to assume any desired geometrical shapes a shown, e.g., in FIGS. 1 and 4.

Due to such mode of bonding, namely the sintering of material components, there develops a material which, on the one hand, exhibits macropores attributable to the granular shape of synthetic material and activated carbon but, on the other hand, is exceptionally microporous in the activated carbon. Both characteristics significantly promote immobilization of the microorganisms. This is shown, e.g., on the basis of tests during which it was ascertained that extinction takes place as a function of time. A substantial decrease, indicative of a pronounced growth of bacteria, can be ascertained already after a few hours.

Furthermore, the thus obtained carrier material 1 exhibits a density which is below and very close to 1.0 and hence the material swims in customary substrate liquids in such a way that it is nearly submerged.

The utilization of the carrier material is a fluidized bed necessitates only a minute consumption of energy and a low flow velocity so that its shearing forces upon the solid materials are also relatively small.

A further modification of the novel carrier material 1 is constituted by a porous body to which, in addition to its percentages of thermoplastic synethetic material and activated carbon, there is added a quantity of up to a maximum 10 percent by weight of metallic powder (e.g., nickel) prior to sintering. In this manner, the density can be increased up to a value of slightly above 1.0 (specific weight) to thus influence the swimming capability.

Furthermore, the metallic powder can additionally develop an effect which promotes the change of material. It is known that, e.g., nickel acts catalytically in the course of certain material changing processes.

Another field of utilization is seen to reside in microbic purification of waste air containing constituents which can be decomposed by biotechnical eans. In such instances, the described sintered plastic/activated carbon material again acts as a carrier material 1 for microorganisms.

The carrier material 1 can be furnished in the form of a flowable granulate, preferably also in various dimensionally stable shapes which may be of a complex geometric configuration. The Figures show a few examples, such as substantially cylindrical at 2, box-shaped at 3, accordion at 4, and others.

The geometric shape of a carrier material 1 or a shaped body will be determined to a large extent by the circumstances of installation, not only in connection with the use in liquid but also in gases, so that it need not be further discussed here.

We claim:

1. Carrier material for the immobilization of microorganisms, particularly for use in connection with microbiological conversion and/or separation of constituents from gaseous or liquid media, which consists essentially of: a dimensionally stable macroporous skelton having a pore size of from abut 10 to 200 $\mu$m, said skelton having been formed by bonding together a relatively coarse-grain pre-formed granular first component and a relatively fine grain granular microporous second component such that the spaces between the individual granules of said first and second components define micropores, said second component comprising micropores having a pore size of up to 0.1 $\mu$m, said micropores and said macropores providing immobilization sites for the absorption of microorganisms.

2. The carrier material according to claim 1, wherein said coarse-grain granular first component comprises heat sinterable thermoplastic granules and wherein said skeleton has been formed by sintering individual granules of said first component to each other and to granules of said second component.

3. The carrier material according to claim 1, wherein said coarse-grain granular first components comprises a granular material having an adhesive surface and wherein said skeleton has been formed by adhesively bonding individual granules of said first component to each other and to granules of said second component.

4. The carrier material according to claim 1, wherein said second component is selected from the group consisting of activated carbon and fine-pore clay material.

5. The carrier material according to claim 4, wherein the dimensions of said macropores in said skeleton are determined by the particle sizes of said granular first and second components.

6. The carrier material according to claim 1, which has been formed into a predetermined geometrical shape during the bonding together of said granules of said first and second components.

7. The carrier material according to claim 4, which has been formed into a predetermined geometrical shape during the bonding together of said granules of said first and second components.

8. The carrier material according to claim 1, wherein said macroporous skeleton further comprises granules of a finely divided catalytic agent.

9. The carrier material according to claim 4, wherein said macroporous skeleton further comprises granules of a finely divided catalytic agent.

10. The carrier material according to claim 1, wherein said macroporous structure further comprises granules of a finely divided density modifying agent for selectively adjusting the density of said carrier material.

11. The carrier material according to claim 4, wherein said macroporous structure further comprises granules of a finely divided density modifying agent for selectively adjusting the density of said carrier material.

12. The carrier material according to claim 1, wherein said macroporous structure further comprises nickel in a finely pulverant state.

13. The carrier material according to claim 4, wherein said macroporous structure further comprises nickel in a finely pulverant state.

14. A method of forming a carrier material for the immobilization of microorganisms, particularly for use in connection with microbiological conversion and/or separation of constituents from gaseous or liquid media, which comprises:

(1) mixing together a relatively coarse-grain preformed granular first component with a relatively fine grain granular second component, said second component having micropores of up to 0.1 $\mu$m in size; and (2) forming the mixture of step (1) into a dimensionally stable macroporous skeleton having the granules of said first and second components bonded to each other, said macroporous skeleton having a pore size of from about 10 to 200 $\mu$m.

15. The method of claim 14, wherein said first component comprises a sinterable thermoplastic material and wherein said macroporous skeleton is formed by heat sintering granules of said thermoplastic material to each other and to said second component.

16. The method of claim 14, further comprising the step of adding a finely divided catalytic agent to the mixture of said first and second components preior to forming said mixture into said macroporous skeleton.

17. The method of claim 14, further comprising the step of adding a finely divided density modifying agent to the mixture of said first and second components prior to forming said mixture into said macroporous skeleton.

18. The method of claim 14, further comprising the step of adding nickel in a finely pulverant state to the mixture of said first and second components prior to forming said mixture into said macroporous skeleton.

19. The method of claim 14, wherein said second component is selected from the group consisting of activated charcoal and fine-pore clay material.

* * * * *